United States Patent
Norris et al.

(10) Patent No.: US 12,252,814 B2
(45) Date of Patent: Mar. 18, 2025

(54) FRAY RESISTANT STRUCTURE

(71) Applicant: ATEX Technologies, Inc., Pinebluff, NC (US)

(72) Inventors: Stephanie Norris, Pinebluff, NC (US); Brian McMurray, Pinebluff, NC (US); Adam Macdonald, Pinebluff, NC (US)

(73) Assignee: ATEX Technologies, Inc., Pinebluff, NC (US)

( * ) Notice: Subject to any disclaimer, the term of this patent is extended or adjusted under 35 U.S.C. 154(b) by 94 days.

(21) Appl. No.: 18/051,482

(22) Filed: Oct. 31, 2022

(65) Prior Publication Data

US 2023/0081877 A1    Mar. 16, 2023

Related U.S. Application Data (63) Continuation of application No. PCT/US2021/030368, filed on May 1, 2021.

(60) Provisional application No. 63/018,999, filed on May 1, 2020.

(51) Int. Cl.
*D02G 1/02*    (2006.01)
*D02G 1/00*    (2006.01)

(52) U.S. Cl.
CPC .......... *D02G 1/0286* (2013.01); *D02G 1/004* (2013.01); *D10B 2321/022* (2013.01)

(58) Field of Classification Search
CPC . D02G 1/0286; D02G 1/004; D10B 2321/022
See application file for complete search history.

(56) References Cited

U.S. PATENT DOCUMENTS

| | | | | |
|---|---|---|---|---|
| 3,691,750 A | * | 9/1972 | Waters | D02G 3/36 57/208 |
| 3,698,178 A | * | 10/1972 | Iwaoka | D02G 1/0266 28/258 |
| 3,780,515 A | * | 12/1973 | Waters | D02G 3/24 57/283 |
| 3,857,233 A | * | 12/1974 | Cardinal | D02G 1/0286 57/287 |
| 3,874,160 A | * | 4/1975 | Kitazawa | D02G 1/0286 28/247 |
| 3,949,544 A | * | 4/1976 | Kitazawa | D02G 1/0253 57/284 |
| 3,956,878 A | * | 5/1976 | Schaffer | D02G 1/0286 57/288 |
| 3,983,687 A | * | 10/1976 | Lewis | D02G 3/322 57/313 |
| 4,910,062 A | * | 3/1990 | Zinke | D04B 1/02 428/95 |
| 5,102,713 A | * | 4/1992 | Corbin | D05C 17/026 428/362 |

(Continued)

OTHER PUBLICATIONS

United States International Search Authority, International Search Report and Written Opinion for Appl. PCT/US2021/030368, pp. 1-13.

*Primary Examiner* — Bao-Thieu L Nguyen
(74) *Attorney, Agent, or Firm* — BrainSpark Associates, LLC; Sandra Saenz (57) ABSTRACT

The improved multifilament structure is a low denier, heat treated multifilament structure that provides for advantageous mechanical properties, including fray resistance, low shrinkage, high tensile strength and low elongation.

17 Claims, 4 Drawing Sheets

(56) References Cited

U.S. PATENT DOCUMENTS

| | | | | |
|---|---|---|---|---|
| 5,875,797 | A | * | 3/1999 | Chiang ................ A61C 15/041 |
| | | | | 132/321 |
| 5,908,039 | A | | 6/1999 | Ochs et al. |
| 6,027,592 | A | | 2/2000 | Tseng et al. |
| 6,287,688 | B1 | * | 9/2001 | Howell ..................... D01F 6/62 |
| | | | | 428/364 |
| 11,131,042 | B1 | * | 9/2021 | Kim ......................... D02G 3/12 |
| 2004/0224406 | A1 | * | 11/2004 | Altman .................... A61P 9/00 |
| | | | | 435/395 |
| 2005/0053759 | A1 | * | 3/2005 | Rock ........................ D04B 1/02 |
| | | | | 428/91 |
| 2010/0105865 | A1 | * | 4/2010 | Telford ................... A61P 33/02 |
| | | | | 435/325 |
| 2011/0154798 | A1 | * | 6/2011 | Ganahl ................... D02G 3/28 |
| | | | | 57/284 |
| 2017/0175304 | A1 | | 6/2017 | Woodruff et al. |
| 2019/0009199 | A1 | * | 1/2019 | Gur-Reznik ......... B01D 29/216 |
| 2023/0313419 | A1 | * | 10/2023 | Mandawewala .......... D01F 6/62 |
| | | | | 424/404 |
| 2023/0371632 | A1 | * | 11/2023 | Lee ........................ D02G 1/205 |

\* cited by examiner

| Trial ID | Process Description | Extrusion Trial | Twist (TPI) | Draw Ratio | Denier (Calculated) | Number of Filaments | Diameter (inches) | Breaking Strength (g) | Elongation (%) | Fraying/Comments |
|---|---|---|---|---|---|---|---|---|---|---|
| CST1 | Customer Sample (9-0 Deklene) | | | | ~10 (per customer) | 1 | 0.00105 | 88.43 | 23.52 | N/A - Monofilament |
| CST2 | Customer Sample (Biogeneral Braid @ 60 PPI) | | | | 9 | 4 | 0.00175 | 72.8 | 21.61 | Limited / No apparent Fraying |
| 12-0 | Extruded - Drawn | 12 | 0 | 1.43 @ 90C | 12.36 (Measured) | 4 | 0.00215 | 84.4 | 25.79 | Frayed Significantly |
| 12-2 | Extruded - Twisted - Drawn | 12 | 48 | 1.28 @ 120C | ~14 | 4 | 0.00221 | 82.65 | 35.93 | Limited / No apparent Fraying |
| 8-1 | Extruded - Twisted - Drawn | 8 | 48 | 1.31 @ 120C | ~7.5 | 4 | 0.00160 | 40.84 | 82.72 | Limited / No apparent Fraying |
| 8-2 | Extruded - Twisted - Drawn | 8 | 48 | 1.43 @ 120C | ~7 | 4 | 0.00158 | 44.72 | 72.07 | Limited / No apparent Fraying |
| 8-3 | Extruded - Twisted - Drawn | 8 | 48 | 1.57 @ 120C | ~5.5 | 4 | 0.00138 | 43.79 | 41.04 | Limited / No apparent Fraying |
| 8-4 | Extruded - Twisted - Drawn | 8 | 48 | 1.71 @ 120C | ~5.5 | 4 | 0.00136 | 41.89 | 48.86 | Limited / No apparent Fraying |
| 8-5 | Extruded - Drawn | 8 | 0 | 2.14 @ 90C | ~6.5 | 4 | 0.00153 | 41.60 | 82.35 | Frayed Significantly |
| 8-6 | Extruded - Drawn | 8 | 0 | 2.85 @ 90C | ~5 | 4 | 0.00130 | 36.32 | 29.86 | Frayed Significantly |
| 14-1 | Extruded - Twisted - Drawn | 14 | 48 | 1.26 @ 120C | ~9 | 4 | 0.00178 | 62.82 | 27.27 | Limited / No apparent Fraying |
| 14-2 | Extruded - Twisted - Drawn | 14 | 48 | 1.28 @ 130C | ~9.5 | 4 | 0.00184 | 63.36 | 36.58 | Limited / No apparent Fraying |
| 15-1-1 | Extruded - Twisted - Drawn - Drawn | 15 | 48 | 1.14 @ 120C / 1.14 @ 130C | ~9 | 4 | 0.00175 | 69.39 | 34.24 | Limited / No apparent Fraying |
| 15-1-2 | Extruded - Twisted - Drawn - Drawn | 15 | 48 | 1.14 @ 120C / 1.17 @ 130C | ~8 | 4 | 0.00167 | 64.48 | 27.95 | Limited / No apparent Fraying |
| 16-1-1 | Extruded - Drawn - Twisted - Drawn | 16 | 40 | 1.43 @ 120C / 1.03 @ 130C | ~7 | 4 | 0.00157 | 60.59 | 26.94 | Limited / No apparent Fraying |

FIG. 3

FRAY RESISTANT STRUCTURE

CROSS-REFERENCE TO RELATED APPLICATIONS

This application is a continuation of International PCT Appl. No. PCT/US2021/030368, filed on May 1, 2021, entitled "Fray Resistant Structure," which claims the benefit of U.S. Provisional Application No. 63/018,999 entitled "Fray Resistant Multifilament Structure," filed May 1, 2020, the disclosures of which are incorporated by reference herein in their entireties.

TECHNICAL FIELD

The present invention relates to methods, devices, and systems for an improved low denier multifilament structure. More specifically, the improved multifilament structure is a low denier, heat treated multifilament yarn and/or suture that provides for advantageous mechanical properties, including fray resistance, low shrinkage, high tensile strength and low elongation.

BACKGROUND OF THE INVENTION

Currently, there are different monofilament and/or braided multifilament sutures or yarns that are used throughout various industries. However, monofilament, twisted and/or braided multifilament sutures have many disadvantages. Monofilament suture material is made of a single strand or single fiber and requires great care during handling and tying because crushing or kinking of the suture can fracture or weaken it leading to premature failure. Also, the monofilament suture may be less flexible than its multifilament braided counterpart, as well has a lack of knot security or knot strength.

The conventional braided multifilament structure, suture and/or yarn is composed of several filaments braided together creating a more flexible structure compared to a monofilament suture, but great care must also be observed during manufacturing and use. Braided multifilament sutures and/or structures are often coated with various materials like silicon, wax, PTFE, polycaprolactone, calcium stearate etc. Braided multifilament sutures are inherently strong and flexible due to their construction, but the addition of multiple filaments may impact overall size, mechanical strength, and elongation as the number of ends and picks per inch (PPI) increases. Also, a braided suture may fray and/or unbraid or unravel slightly during handling and use leading difficult handling or the creation of weak areas.

As a result, there is a need to create an improved multifilament structure, yarn and/or suture that preserves its mechanical and other structural properties but incorporates reduced or elimination of fraying. Furthermore, the improved multifilament structure, suture and/or yarn may be low in diameter or high in diameter.

SUMMARY OF THE EMBODIMENTS

In one embodiment, the fray resistant multi-filament structure comprises a twisted multi-filament structure, suture and/or yarn. The twisted multi-filament structure comprising a plurality of filaments with a total twists-per-inch, each of the plurality of filaments comprising a material; and a plurality of unions along at least a portion of the plurality of filaments with at least one union positioned between the plurality of filaments.

In another embodiment, the method of creating a fray resistant multi-filament structure (FRMS) comprising the steps of: creating or providing a multi-filament structure, the multi-filament structure comprising a plurality of filaments, each the plurality of filaments comprising a material; twisting the plurality of filaments into a total twists-per-inch to create the multi-filament structure; and performing a first post-processing drawing and a second post-processing drawing the multi-filament structure to create the fray resistant multi-filament structure. The first post-processing drawing comprises a first one or more settings and the second post-processing drawing may comprise a second one or more settings. The first and second one or more settings comprise the same one or more settings or different one or more settings. The one or more settings may comprise a speed setting, a temperature setting, a draw ratio, and a tension setting, and/or any combination thereof.

In another embodiment, the method of creating a fray resistant multi-filament structure (FRMS) comprising the steps of: creating or providing a multi-filament structure, the multi-filament structure comprising at least one yarn, the at least one yarn comprising a plurality of filaments, each the plurality of filaments comprising a material; twisting the plurality of filaments into a total twists-per-inch to create the multi-filament structure; and performing at least one post-processing drawing on the multi-filament structure to create the fray resistant multi-filament structure with at least one union between the plurality of filaments. The at least one processing drawing comprises one or more settings. The at least one processing drawing comprises a first post-processing drawing and a second post-processing drawing. The first post-processing drawing comprises a first one or more settings and the second post-processing drawing may comprise a second one or more settings. The first and second one or more settings comprise the same one or more settings or different one or more settings. The one or more settings may comprise a speed setting, a temperature setting, a draw ratio, and a tension setting, and/or any combination thereof.

In another embodiment, the method of creating a fray resistant multi-filament structure (FRMS) comprising the steps of: creating or providing a multi-filament structure, the multi-filament structure comprising at least one plied yarn, the at least one plied yarn comprising a plurality of monofilaments, each the plurality of monofilaments comprising a material; plying the plurality of monofilaments; twisting the plurality of monofilaments into a total twists-per-inch to create the multi-filament structure; and performing at least one post-processing drawing on the multi-filament structure to create the fray resistant multi-filament structure with at least one union between the monofilaments. The at least one processing drawing comprises one or more settings. The at least one processing drawing comprises a first post-processing drawing and a second post-processing drawing. The first post-processing drawing comprises a first one or more settings and the second post-processing drawing may comprise a second one or more settings. The first and second one or more settings comprise the same one or more settings or different one or more settings. The one or more settings may comprise a speed setting, a temperature setting, a draw ratio, and a tension setting, and/or any combination thereof.

In another embodiment, the method of creating a fray resistant multi-filament structure (FRMS) comprising the steps of: creating or providing a multi-filament structure, the multi-filament structure comprising a plurality of yarns, each of the plurality of yarns comprising a material; twisting the plurality of yarns into a total twists-per-inch to create the multi-filament structure; and drawing the multi-filament structure to create the fray resistant multi-filament structure with at least one union between the plurality of yarns. The drawing comprises one or more settings. The one or more settings may comprise a speed setting, a temperature setting, a draw ratio, and a tension setting, and/or any combination thereof. Each of the plurality of yarns further comprising a monofilament and/or a plurality of filaments.

In another embodiment, the method of creating a fray resistant multi-filament structure (FRMS) comprising the steps of executing a primary process and executing a secondary process. The primary process comprises executing the extrusion process, the extrusion process including extruding and extrusion drawing steps. The secondary process comprises a twisting process step and a post-process drawing step. The post-process drawing step comprises one or more settings, the one or more settings comprises a speed setting, a temperature setting, a tension setting, a draw ratio and/or any combination thereof. Alternatively, the secondary process comprises a twisting process step, a first post-process drawing step, and a second post-process drawing step. The first post processing step comprises a first one or more settings, and a second post processing step comprises a second one or more settings. The first and second one or more settings may comprise the same or different one or more settings. The one or more settings comprises a speed setting, a temperature setting, a tension setting, a draw ratio and/or any combination thereof.

In another embodiment, the fray resistant multi-filament structure (FRMS) comprises: at least one yarn, the at least one yarn comprises a plurality of filaments twisted to a twists-per-inch, each of the plurality of filaments comprises a material, the at least one yarn includes one or more unions binding a portion of each of the plurality of filaments to each other along a length of the at least one yarn using a drawing temperature. Each of the plurality of filaments comprising a material includes the same material or a different material. The material may comprise polypropylene (PP). The twists-per-inch (TPI) comprises a range of 20 to 60. The drawing temperature is greater than the glass-transition temperature of the material to create the fray resistant multi-filament structure. The drawing temperature is greater than the glass-transition temperature of the material but below a melting point of the material. The drawing temperature is equal to or greater than a melting point of the material. The drawing temperature is equal to or below than a melting point of the material. The drawing temperature is within a range of 50% to 85% below a melting point of the material. The drawing temperature is within a range of 30 degrees to 70 degrees below a melting point of the material.

In another embodiment, the fray resistant multi-filament structure (FRMS) comprises: a plurality of yarns (plied yarn), the plurality of yarns being twisted to a twists-per-inch, each of the plurality of yarns comprises a material, the plurality of yarns includes one or more unions binding a portion of each of the plurality of yarns to each other along a length of the plurality yarns using a drawing temperature. Each of the plurality of yarns comprising a material includes the same material or a different material. The material may comprise polypropylene (PP). The twists-per-inch (TPI) comprises a range of 20 to 60. The drawing temperature is greater than the glass-transition temperature of the material to create the fray resistant multi-filament structure. The drawing temperature is greater than the glass-transition temperature of the material but below a melting point of the material. The drawing temperature is equal to or greater than a melting point of the material. The drawing temperature is equal to or below than a melting point of the material. The drawing temperature is within a range of 50% to 85% below a melting point of the material. The drawing temperature is within a range of 30 degrees to 70 degrees below a melting point of the material. Each of the plurality of yarns further comprising a monofilament and/or a plurality of filaments.

In another embodiment, the fray resistant multi-filament structure (FRMS) comprises: a plurality of yarns (plied yarn), each of the plurality of yarns comprises a plurality of filaments, the plurality of filaments being twisted to a first twists-per-inch, the plurality of filaments includes a first one more unions binding a portion of each of the plurality to filaments each other along a length of the plurality of the plurality of filaments, the plurality of yarns being twisted to a second twists-per-inch, the plurality of yarns includes a second one or more unions binding a portion of each of the plurality of yarns to each other along a length of the plurality yarns using a second drawing temperature. Each of the plurality of yarns or the each of the plurality of filaments comprising a material includes the same material or a different material. The material may comprise polypropylene (PP). The first and second twists-per-inch may be the same or different. The twists-per-inch (TPI) comprises a range of 20 to 60. The first drawing temperature and the second drawing temperature may be the same or different. The drawing temperature is greater than the glass-transition temperature of the material to create the fray resistant multi-filament structure. The drawing temperature is greater than the glass-transition temperature of the material but below a melting point of the material. The drawing temperature is equal to or greater than a melting point of the material. The drawing temperature is equal to or below than a melting point of the material. The drawing temperature is within a range of 50% to 85% below a melting point of the material. The drawing temperature is within a range of 30 degrees to 70 degrees below a melting point of the material.

BRIEF DESCRIPTION OF THE SEVERAL VIEWS OF THE DRAWINGS

FIG. 3 illustrates a graphical table with data describing conventional suture and improved suture and/or yarn process settings and mechanical strength data.

DETAILED DESCRIPTION OF THE INVENTION

Figure 1A:
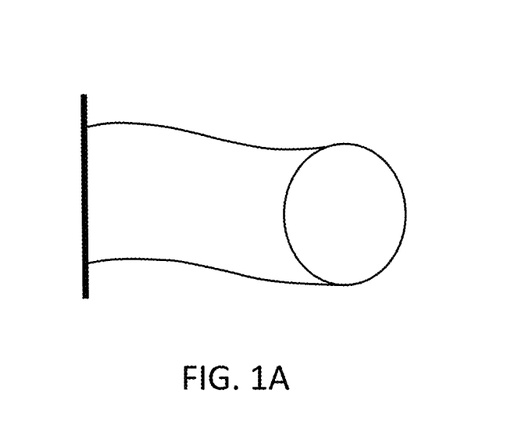
FIGS. 1A-1C depicts a side view of one embodiment of different types of sutures or yarns.
Figure 1B:
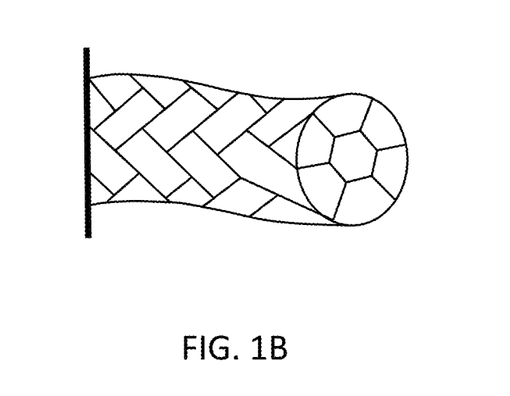
Figure 1C:
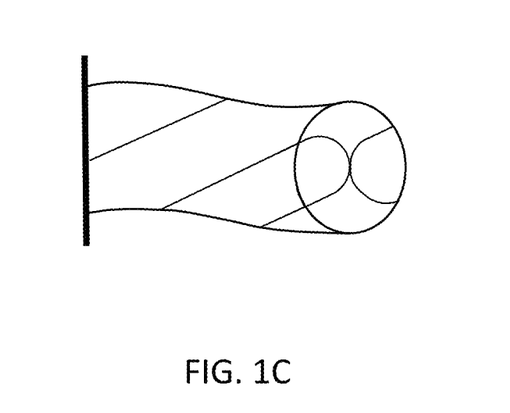
Figure 2A:
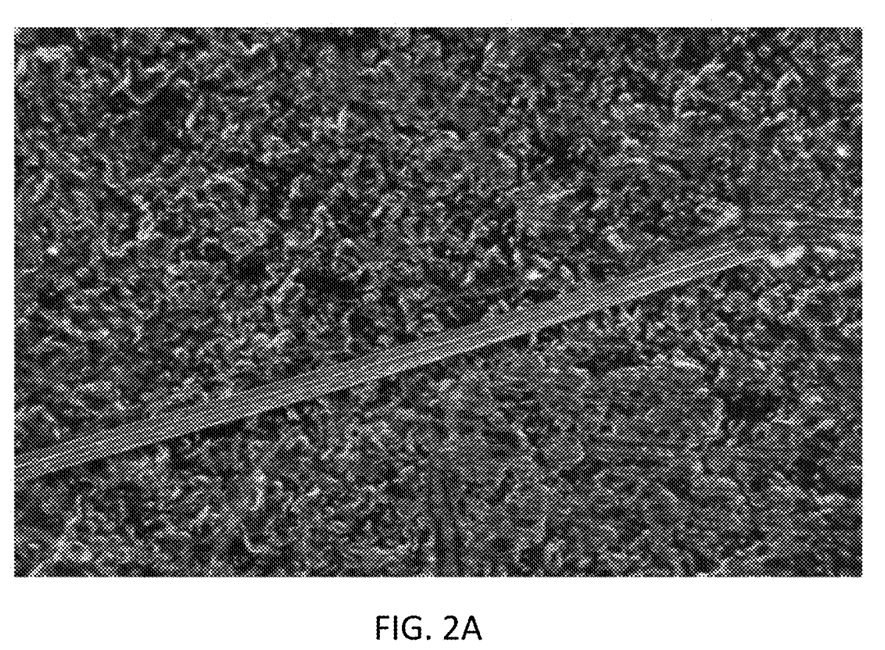
FIGS. 2A-2C depicts a magnified isometric view of different embodiment of the different structures, sutures and/or yarns cut to illustrate damaged or frayed ends.
Figure 2B:
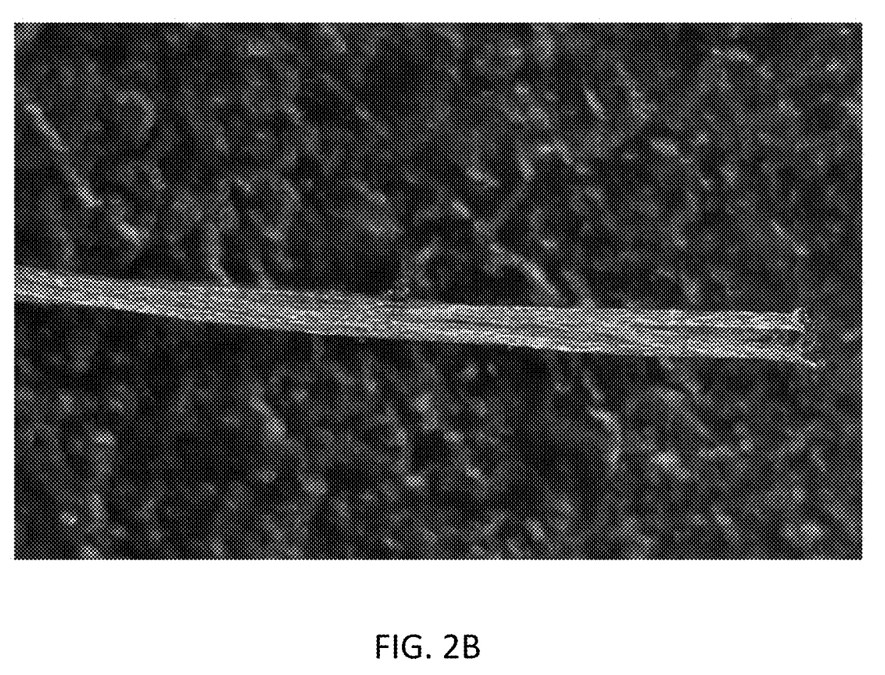
Figure 2C:
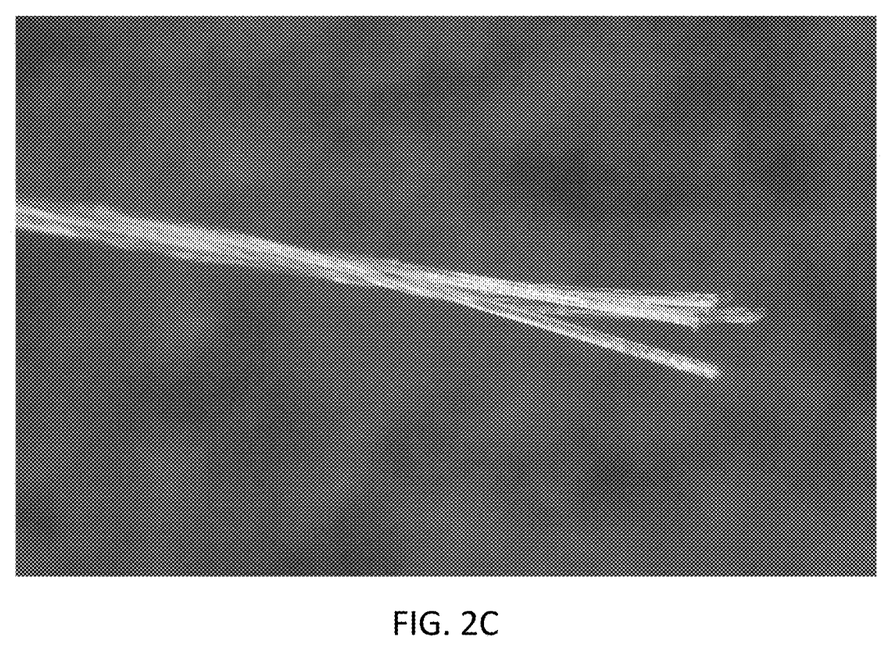
Figure 2D:
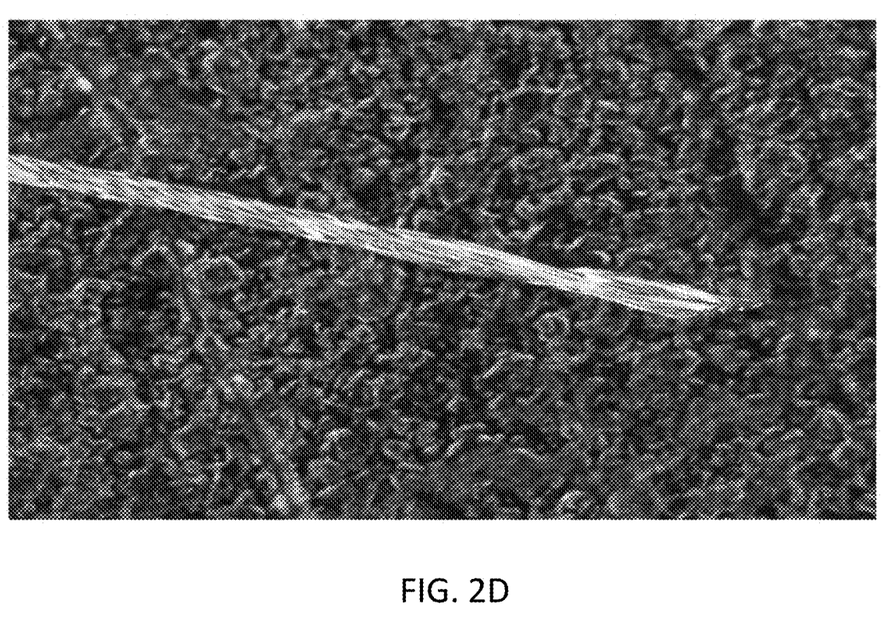
FIG. 2D depicts a magnified side view of one embodiment of the improved multi-filament structure, suture and/or yarn cut to illustrate undamaged or unfrayed ends.

FIGS. 1A-1C depicts side views of one embodiment of different types of conventional commercially available sutures—a monofilament, a braided multifilament and a twisted multifilament. The traditional or conventional commercially available multifilament sutures has many disadvantages during manufacturing, handling and/or use because it may fray and/or create regions of unbraided or untwisted (e.g., unraveled) sections and/or crimped sections as shown in FIGS. 2A-2C. When this occurs, threading becomes difficult, or it can create weaken different regions leading to premature failure. As a result, the improved multifilament structure preserves or enhances the mechanical properties of a conventional multifilament suture structure and/or reduces or eliminates frayed ends, thus creating a fray resistant multifilament suture (FRMS) as shown in FIG. 2D.

The FRMS structure is a structure that is uniquely manufactured by undergoing extrusion, and post-processing that enables the structure to be twisted and drawn to prevent fraying or untwisting in specific regions. The post-processing steps desirably allows the plurality of filaments to be heated beyond the material's glass-transition temperature to create a plurality of unions along at least a portion of the FRMS structure and the plurality of unions may be positioned between each of the plurality of filaments that form the FRMS structure. Such unions contain enough "coupling" or "union" or "fusion" or "adhesion" force to prevent fraying or untwisting in a portion of the FRMS structure. The unions may comprise either fused unions or melted unions. The unions may be a mechanical binding or fusion, physical binding or fusion and/or chemical binding or fusion of one or more filaments. FIG. 3 illustrates a graphical table with data describing conventional suture and improved suture process settings and mechanical strength data. The term "structure" may be used interchangeably with "yarn" or "suture."

The FRMS Structure

In one embodiment, the fray resistant multi-filament structure with low shrinkage comprises a twisted multi-filament structure or yarn and/or plied yarn. The twisted multi-filament structure or yarn comprising a plurality of filaments with a total twists-per-inch, each of the plurality of filaments comprising a material; and a plurality of unions along at least a portion of the plurality of filaments with at least one union positioned between the plurality of filaments. Desired properties of the braided multifilament suture consist of none or minimum fraying or unraveling and low shrinkage, preferably less than 6% shrinkage after further processing, such as sterilization.

In another embodiment, the fray resistant multi-filament structure may comprise at least one yarn or a plurality of yarns (e.g., plied yarns). The at least one yarn may comprise one or more filaments, and/or a plurality of filaments. The plurality of yarns and/or each of the plurality of yarns may comprise of one or more filaments, a monofilament or a plurality of filaments. The table below describes different examples of a yarn with a plurality of filaments or plurality of yarns (e.g., plied yarns) with a plurality of monofilaments manufactured with same denier per filament (dpf).

|  | Multifilament Yarn | Monofilament Yarn |
|---|---|---|
| Yarn Denier | 14 | 3.5 |
| # of filaments when Extruded | 4 | 1 |
| Total Ply | 1 | 4 |
| Denier per Filament (dpf) | 3.5 | 3.5 |
| Yarn Description (Ply/Denier/Filaments) | 1/14/4 or 14/4 | 4/3.5/1 |

The plurality of filaments, plied yarns and/or yarn may comprise average diameter. The average diameter includes 0.001 mm to 0.899 mm, more preferably 0.001 mm to 0.040 mm, more preferably 0.001 mm to 0.029 mm, more preferably 0.020 mm to 0.029 mm, more preferably 0.010 mm to 0.019 mm, or more preferably 0.001 mm-0.009 mm.

The plurality of filaments, plied yarns and/or yarn may comprise a linear density. The linear density is defined by a denier, a denier is the weight in grams of 9,000 meters of yarn. The linear density includes 2 denier or higher, 10 denier or higher, 20 denier or higher, 40 denier (44 decitex) or higher, less than 100 denier, less than 80 denier, less than 40 denier, 30 denier or less, 20 denier or less, 10 denier or less, and/or any combination thereof. More specifically, the linear density includes 5 denier to 15 denier and/or the linear density may include 5 denier to 10 denier, and/or 7 denier to 12 denier.

The plurality of filaments, plied yarns and/or yarn may comprise a denier per filament (dpf). The DPF is defined as the denier divided by the number of filaments. The DPF includes 2 dpf or higher, 5 dpf or higher, 10 dpf or higher, 15 dpf or higher, 20 dpf or higher, and/or any combination thereof. In another embodiment, the DPF includes 20 dpf or less, 15 dpf or less, 10 dpf or less, 5 dpf or less, 3.5 dpf or less and/or any combination thereof. More specifically, the DPF includes 0.5 dpf to 20 dpf, 0.5 dpf to 5 dpf, 1 dpf to 5 dpf, 1.25 dpf to 3.5 dpf, 5 dpf to 10 dpf, and/or 7 dpf to 12 dpf, and/or any combination thereof.

The plied yarn, yarn, the plurality of filaments and/or one or more filaments may comprise one or more twists-per-inch (TPI) or one or more interlacing. A twist is the spiral arrangement of filaments around the yarn's or filaments' axis, and it is specified by number of turns per unit length-otherwise known as turns per inch (TPI). Partially oriented yarns or all yarns oriented in the same or similar direction may be twisted in the disclosed embodiment. In one embodiment, yarns may be twisted while low tension (2-4 g) is applied. In one embodiment, the one or more twists may include a range of 20 twist to 60 twists; the range may include 20 twists to 50 twists; the range may include 20 twist to 30 twists; the range may include 20 twist to 40 twists; the range may include 40 twists to 50 twists. The TPI may also comprise a specific twist direction. The twist direction may comprise a S or Z direction twist—the S or Z of the twist refer to a specific spiral direction. The S twist refers to the direction of the twist or spiral of the filaments is parallel to the center bar of the letter "S." The Z twist refers to the direction to the twist or spiral of the filaments is parallel to the center bar of the letter "Z.". Ply, plied, and/or folded yarns composed of two or more single yarns of same or different materials twisted together may be used. Such plied yarns comprise one or more yarns or a plurality of yarns. Each yarn or each plurality of yarns may comprise a monofilament or a plurality of filaments.

The FRMS structure, the plied yarns, the yarn, the plurality of filaments and/or each of the plurality of filaments comprising a material includes the same material and/or each of the plurality of filaments comprising a material that includes different materials. The plurality of filaments and/or the one or more filaments comprises a material. The material comprising a polymer, as well as thermoplastic materials, and absorbable materials, and/or any combination thereof. Polymers may include fluorocarbons (C), polyethylene terephthalate (PET), polyurethane (PU), polytetrafluoroethylene (PTFE), expanded polytetrafluoroethylene (PTFE), polycarbonates ("PC"), ABS, polypropylene (PP), polystyrene, polyethylene (PE), polyester, polyacetal, elastomers, thermoplastic polyurethane (TPU), nylon, ionomers, polyvinyl chloride (PVC) and/or any combination thereof, as well as other medical grade materials known by those of ordinary skill in the textile art. The polyethylene (PE) comprises ultra-high molecular weight polyethylene (UHMWPE), low density polyethylene (LDPE), medium density polyethylene (MDPE) and/or any combination thereof. Absorbable materials may include polyglactin 910, polyglycolic acid, polyglyconate, polydioxanone, poliglecaprone and/or any combination thereof.

The FRMS structure, the plied yarns, the yarn, the plurality of filaments and/or each of the plurality of filaments may comprise a plurality of unions or fusions. The plurality of fused unions are the unions that are created by the process of increasing the temperature equal to or greater than the glass-transition temperature of a material from the glass to the rubber-like state, marking a region of dramatic changes in the physical properties of a material, such as hardness and elasticity, which some molecular chains start to move by external force, but without changing polymer composition, to create one or more regions of unions, a frictional surface or tacky surface (e.g., rubber-like or sticky surface or tacky surface), and/or may or may not have minor molecular cross-linking. The frictional or tacky surface engages with the adjacent plurality of filaments to create a plurality of mechanical, chemical and/or physical unions that prevent the plurality of filaments, yarns, monofilaments from prematurely untwisting or unbraiding, and/or fraying. The unions or fusions formed cohesive bundles during the heat setting process and/or drawing process may fill voids, gaps or space between each of the filaments within the braid configuration. Filling space between the filaments, monofilaments or yarns may be useful for providing fraying resistant, shrink resistant and bacterial resistant properties to the structure.

The plurality of unions may or may not comprise a plurality of melted unions and/or a plurality of fused unions. Fusing is the process of joining or binding a portion of the yarns or filaments, the plurality of yarns, the plurality of filaments, each of the plurality of yarns and/or each of the plurality of filaments to form a bound entity by heating to greater than a glass transition point (or by pressure), to create or undergo one or more regions of unions or fusions with at least a portion of the adjacent plurality of filaments. The plurality of unions or fusions may include melting unions that are created by the process of melting a portion of the plurality of filaments during the draw winding process or post-processing technique. Melting union includes the temperature at which the materials or each of the materials changes state from a solid to liquid, allowing the liquid materials to combine and recrystallize to a unified solid material.

At least a portion of the FRMS structure, plied yarns, the yarn, the plurality of filaments and/or each of the filaments may be thermally or heat set. Thermal or heat setting is a thermal process that takes place in either a steam atmosphere or a dry heat environment. The effect of the thermal process gives fibers, yarns or materials dimensional stability. In some embodiments, it may be important to expose the filaments to an increase temperature or steam to thermally set or retain the filament directional shape or twist. Thermally setting the filaments, yarns, and/or braided structure may improve the twist or braid to not easily snarl, come apart, unravel, shrink or fail. In addition, thermally setting may improve the filaments and/or the FRMS structure or yarn by improving the stress-strain and recovery behavior, dye uptake, optical properties, mechanical properties and/or thermal properties, and/or any combination thereof. For example, thermally setting may improve breaking strength, elongation at break, tenacity and work of rupture for the filaments or at least a portion of the FRMS structure. In one embodiment, the post-secondary process may further comprise a heat set or thermal set.

The FRMS structure, the plied yarns, the yarn, the plurality of filaments and/or each of the filaments may comprise a coating. Alternatively, the FRMS structure, the plied yarns, the yarn, the plurality of filaments and/or each of the filaments may not comprise a coating. The coating may include any material to improve the fray properties of the suture. An optional coating may consist of various materials like silicon, wax, PTFE, polycaprolactone, calcium stearate, biologic material, like fibrin, or any combination thereof.

FRMS Manufacturing Process

The FRMS structure comprises the steps of executing a primary process and executing a secondary process. The primary process comprises executing the extrusion process. The extrusion of the plurality of filaments may include standard processes and/or standard settings known in the art. Alternatively, the extrusion of the plurality of filaments may comprise a custom process and/or custom settings.

Normally, one or more filaments are created or provided by extruding melted polymers through a spinneret. The spinneret comprises a plurality of holes that allows the melted polymer to be extruded at a particular flow rate through the plurality of holes. The flow rate must remain constant if the filaments are to have a consistent diameter. Once the filaments have been extruded, they can be cooled or quenched, or may not require any further processing. For large diameter filaments (>100 microns) this is usually done in a water bath. When small diameter monofilament fibers are extruded, they can also be quenched in air chambers (steam or dry air). The speed of the rolls in the water bath is a function of the fiber diameter, and the larger the diameter of the monofilament, the lower is the speed of extrusion. A typical spinning speed for large monofilaments is in the range of 30-100 m per min. If a large number of filaments are spun from a pack, there may be several rows of spin holes which are slightly staggered so that the filaments come together on the first roll in the water bath in a band or sheet of individual threadlines. From the first roll, the filaments travel to the second roll and exit the water bath. An air knife at the exit of the water bath is usually used to strip as much water as possible from the fibers before entering the draw stage.

The monofilaments after extrusion and quenching are still highly unoriented and need to be stretched in order to get finer yarns and keep or set the bundles together for the high strength (tenacity) required for most applications, this occurs during the extrusion drawing or draw winding stage. The filaments may undergo a hot air oven or steam air conditioning that heats the filaments to the point where they can be easily drawn or stretched. A second series of rolls is used at the exit of the oven to increase the speed of the filaments by 4-7 times. In most cases, two ovens and three sets of rolls are used for drawing or winding. Each set of rolls is controlled by an inverter that controls the draw rates, temperature setting and tension for the filaments.

In one embodiment, the executing a primary process may comprise providing or creating a plurality of filaments, a yarn and/or plied yarn through the extrusion process. In one embodiment, the extrusions process comprises extruding two or more filaments and drawing the one or more filaments. The drawing or draw winding of the one or more filaments comprises a one or more settings, the one or more settings comprises a flow rate or speed setting, a temperature setting, a draw ratio and a tension setting. The one or more settings may vary in order to achieve a plurality of filaments with mechanical or structural properties including a high elongation, a medium elongation and/or a low elongation.

In one embodiment, spinnerets were used to create yarn bundles of 4 filaments each. The high elongation used speed settings between 2700 to 2740 m/min (other embodiments used speed settings between 35 to 50 m/min with wrapping 8 times around the rollers), and the temperature settings used no heat or zero heat. The medium elongation used speed settings between 1200 to 2740 m/min and used temperature settings of 50 degrees Celsius to 90 degrees Celsius. One advantage of thermal setting the filaments using this drawing process with heated rollers is the yarn does not shrink. The one or more settings are listed in Table 2 below.

| High Elongation Setup (1.02 Draw Ratio) | | | |
|---|---|---|---|
| Godet 1 Speed (m/min) | 2700 | Godet 1 Temperature (° C.) | No Heat |
| Godet 2 Speed (m/min) | 2720 | Godet 2 Temperature (° C.) | No Heat |
| Godet 3 Speed (m/min) | 2730 | Godet 3 Temperature (° C.) | No Heat |
| Godet 4 Speed (m/min) | 2740 | Godet 4 Temperature (° C.) | No Heat |
| Medium Elongation Setup (2.28 Draw Ratio) | | | |
| Godet 1 Speed (m/min) | 1200 | Godet 1 Temperature (° C.) | 50 |
| Godet 2 Speed (m/min) | 1210 | Godet 2 Temperature (° C.) | 70 |
| Godet 3 Speed (m/min) | 2730 | Godet 3 Temperature (° C.) | 90 |
| Godet 4 Speed (m/min) | 2740 | Godet 4 Temperature (° C.) | 50 |

In one embodiment, the post-secondary process comprises a twisting process and a post-processing drawing or draw winding step. Alternatively, the post-secondary process comprises a twisting process, a first post-process draw or draw winding step and a second post-process draw or draw winding step. The post-secondary process may further comprise a thermal or heat set step. The first post-process draw step comprises a first one or more settings and the second post-process draw step comprises a second one or more settings, the first and second one or more settings may comprise the same one or more settings or comprise different one or more settings. The post-secondary process of twisting and/or post-processing drawing step may improve the torque properties of the multifilament suture.

In another embodiment, the method of creating a fray resistant multi-filament suture (FRMS) comprising the steps of: creating or providing a multi-filament structure, the multi-filament structure comprising a plurality of filaments, each the plurality of filaments comprising a material; twisting the plurality of filaments into a total twists-per-inch to create the multi-filament structure; and post-processing drawing the multi-filament structure to create the fray resistant multi-filament suture.

In another embodiment, the method of creating a fray resistant multi-filament suture (FRMS) with low shrinkage comprising the steps of: creating or providing a multi-filament structure, the multi-filament suture comprising a plurality of filaments, each the plurality of filaments comprising a material; twisting the plurality of filaments into a total twists-per-inch to create the multi-filament structure; and first post-processing drawing and a second post-processing drawing the multi-filament structure to create the fray resistant multi-filament suture with low shrinkage. The first post-processing drawing comprises a first one or more settings and the second post-processing drawing may comprise a second one or more settings. The first and second one or more settings comprise the same one or more settings or different one or more settings. The one or more settings may comprise a speed setting, a temperature setting, a draw ratio, and a tension setting, and/or any combination thereof.

The FRMS structure or yarn, the plurality of filaments, and/or each of the plurality of filaments comprising a material. The material includes the same material and/or each of the plurality of filaments, yarn and/or plied yarns comprising a material that includes different materials. The plurality of filaments and/or the one or more filaments comprises a material. The material comprising a polymer, as well as thermoplastic materials and absorbable materials. Polymers may include silk, polyethylene terephthalate (PET), fluorocarbons, polyurethane (PU), polytetrafluoroethylene (PTFE), expanded polytetrafluoroethylene (PTFE), polycarbonates ("PC"), ABS, polypropylene (PP), polystyrene, polyethylene (PE), polyester, polyacetal, elastomers, thermoplastic polyurethane ("TPU"), nylon, ionomers, polyvinyl chloride ("PVC") and/or any combination thereof, as well as other medical grade materials known by those of ordinary skill in the textile art. The polyethylene (PE) comprises ultra-high molecular weight polyethylene (UHMWPE), low density polyethylene (LDPE), medium density polyethylene (MDPE) and/or any combination thereof. Absorbable materials may include polyglactin 910, polyglycolic acid, polygylconate, polydioxanone, poliglecaprone and/or any combination thereof.

The FRMS structure or yarn, the plurality of filaments and/or one or more filaments may comprise one or more twists-per-inch (TPI) or one or more interlacing. A twist is the spiral arrangement of filaments around the yarn's for filament's axis, and it is specified by number of turns per unit length—otherwise known as turns per inch (TPI). Partially oriented yarns or all yarns oriented in the same or similar direction may be twisted. In one embodiment, yarns may be twisted while low tension (4-6 g) is applied. In one embodiment, the one or more twists may include a range of 20 twist to 60 twists; the range may include 20 twists to 50 twists; the range may include 20 twist to 30 twists; the range may include 20 twist to 40 twists; the range may include 40 twists to 50 twists. The TPI may also comprise a specific twist direction. The twist direction may comprise a S or Z direction twist—the S or Z of the twist refer to a specific spiral direction. The S twist refers to the direction of the twist or spiral of the filaments is parallel to the center bar of the letter "S." The Z twist refers to the direction to the twist or spiral of the filaments is parallel to the center bar of the letter "Z.".

The post-process drawing step comprises the drawing the multi-filament structure comprises drawing at a temperature setting greater than the glass-transition temperature of the material to create the fray resistant multi-filament structure with low shrinkage. The drawing the multi-filament structure comprises drawing at a temperature greater than the glass-transition temperature of the material but below a melting point of the material. The drawing the multi-filament structure comprises drawing at a temperature equal to or greater than a melting point of the material. The drawing the multi-filament structure comprises drawing at a temperature equal to or below than a melting point of the material. Furthermore, the drawing of the multi-filament structure comprising drawing at a temperature within a range of 0.5% to 99%, in a preferred embodiment a range of 25% to 75%, 50% to 85%, 50% to 75%, 25% to 50%, or 56% to 81%, below a melting point of the material. The drawing of the multi-filament structure comprising drawing at a temperature within a range of 30 degrees to 70 degrees below a melting point of the material (160° C.).

In another embodiment, the post-processing drawing comprises a first post-processing drawing and a second post-processing drawing. The first drawing and second drawing comprise drawing to a same temperature or a different temperature. The drawing comprises a draw ratio. The drawing comprises a draw ratio and a temperature greater than glass transition temperature of the material. The drawing comprises a draw ratio and a temperature greater than glass transition temperature of the material, but below a melting point of the material.

In another embodiment, the post-process drawing step comprises a temperature setting, the temperature setting comprises an elevated temperature setting. Desirably, the post processing drawing step comprises a temperature setting of above 50° C., and preferably at least one post-processing drawing step takes place at a temperature setting equal to or above/greater than 200° C., or 160° C. or 130° C. The post processing drawing step comprises a temperature setting between 50° C. to 130° C., the post processing drawing step comprises a temperature setting of 90° C. to 130° C., the post processing drawing step comprises a temperature setting of 100° C. to 130° C., the post processing drawing step comprises a temperature setting of 120° C. to 130° C.

INCORPORATION BY REFERENCE

The entire disclosure of each of the publications, patent documents, and other references referred to herein is incorporated herein by reference in its entirety for all purposes to the same extent as if each individual source were individually denoted as being incorporated by reference.

EQUIVALENTS

The invention may be embodied in other specific forms without departing from the spirit or essential characteristics thereof. The foregoing embodiments are therefore to be considered in all respects illustrative rather than limiting on the invention described herein. The scope of the invention is thus intended to include all changes that come within the meaning and range of equivalency of the descriptions provided herein.

Many of the aspects and advantages of the present invention may be more clearly understood and appreciated by reference to the accompanying drawings. The accompanying drawings are incorporated herein and form a part of the specification, illustrating embodiments of the present invention and together with the description, disclose the principles of the invention.

The invention claimed is:

1. The method of creating a fray resistant multi-filament structure comprising the steps of:
   Providing a multi-filament structure, the multi-filament structure comprising at least one yarn, the at least one yarn includes a plurality of filaments, each the plurality of filaments comprising a material;
   Twisting the plurality of filaments into a twists-per-inch to create a twisted multi-filament structure wherein the twists-per-inch (TPI) comprises a range of 20 TPI to 60 TPI; and
   Drawing the twisted multi-filament structure at a drawing temperature to bind a portion of the plurality of filaments to each other to create one or more unions along the length of the twisted multi-filament structure to form the fray resistant multi-filament structure.

2. The method of creating a fray resistant multi-filament structure of claim 1, wherein fray resistant multi-filament structure further comprises a denier per filament (dpf), the denier per filament includes 0.5 dpf to 5 dpf.

3. The method of creating a fray resistant multi-filament structure of claim 1, wherein the material is polypropylene (PP).

4. The method of creating a fray resistant multi-filament structure of claim 1, wherein the drawing temperature is greater than the glass-transition temperature of the material to create the fray resistant multi-filament structure.

5. The method of creating a fray resistant multi-filament structure of claim 4, wherein the drawing temperature is greater than the glass-transition temperature of the material but below a melting point of the material.

6. The method of creating a fray resistant multi-filament structure of claim 1, wherein the drawing temperature is below a melting point of the material.

7. The method of creating a fray resistant multi-filament structure of claim 1, wherein the drawing temperature comprises a temperature within a range of 30 degrees C. to 70 degrees C. below a melting point of the material.

8. The method of creating a fray resistant multi-filament structure of claim 1, wherein the drawing temperature is below a melting point of the material.

9. The fray resistant multi-filament structure comprising:
   at least one yarn, the at least one yarn comprising a plurality of filaments and a twist, the twist including a twists-per-inch (TPI) comprises a range of 20 TPI to 60 TPI, each of the plurality of filaments comprising a material; and
   a plurality of unions positioned along a length of the at least one yarn, the plurality of unions binding a portion of the plurality of filaments to each other by at least one drawing temperature.

10. The fray resistant multi-filament structure of claim 9, wherein the at least one yarn further comprises a denier per filament (dpf), the denier per filament includes a range of 0.5 dpf to 5 dpf.

11. The fray resistant multi-filament structure of claim 9, wherein the material is polypropylene (PP).

12. The fray resistant multi-filament structure of claim 1, wherein the fray resistant multi-filament structure comprises less than 6% shrinkage.

13. The fray resistant multi-filament structure comprising:
   a plurality of yarns, the plurality of yarns comprising a twist, the twist includes a twists-per-inch (TPI) comprises a range of 20 TPI to 60 TPI, each of the plurality of yarns comprising a material; and
   a plurality of unions positioned along a length of the plurality of yarns, the plurality of unions binding a portion of the plurality of yarns to each other by a drawing temperature.

14. The fray resistant multi-filament structure of claim 13, wherein the material is polypropylene (PP).

15. The fray resistant multi-filament structure of claim 13, wherein the drawing temperature is greater than the glass-transition temperature of the material but below a melting point of the material.

16. The fray resistant multi-filament structure of claim 13, wherein the drawing temperature is below a melting point of the material.

17. The fray resistant multi-filament structure of claim 13, wherein the drawing temperature comprises a range of 30 degrees C. to 70 degrees C. below a melting point of the material.

* * * * *